Patented Jan. 21, 1930

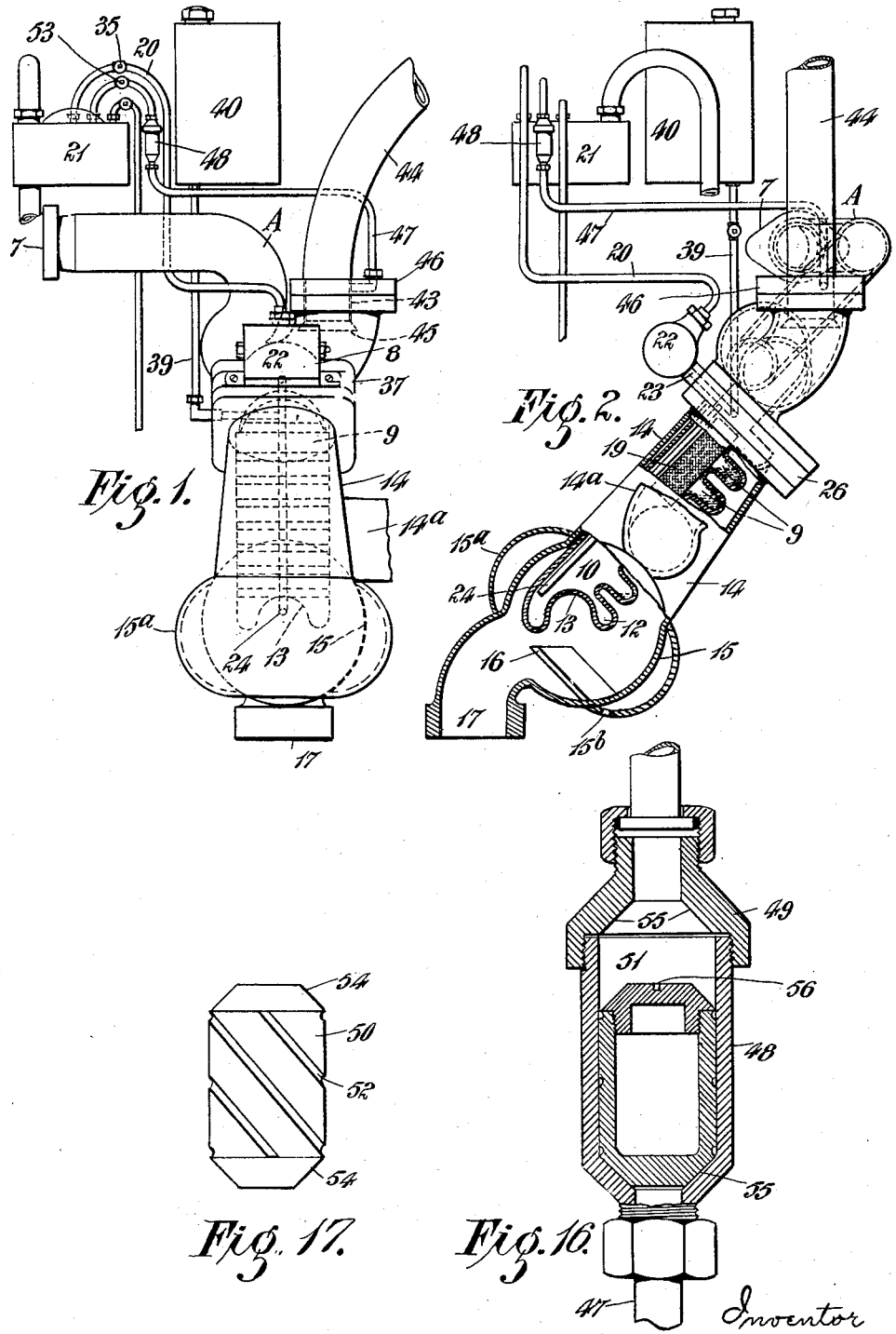

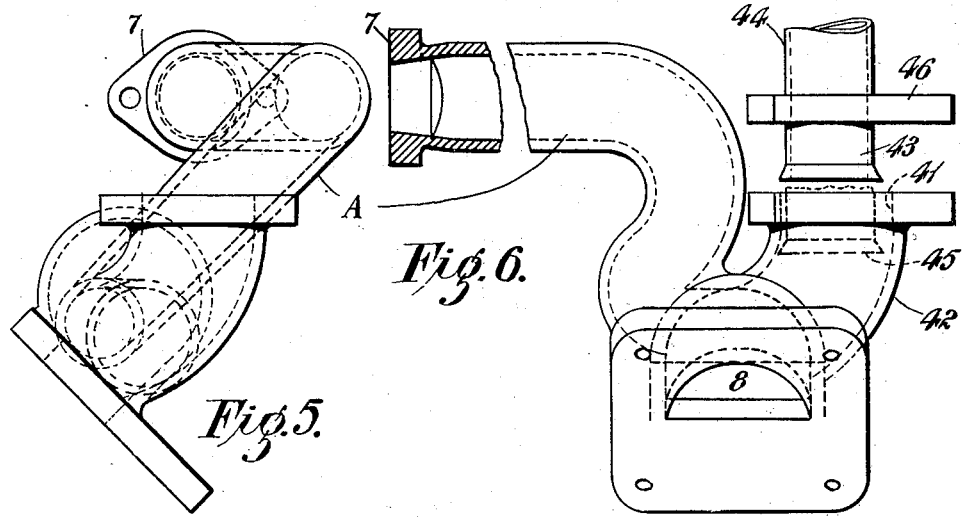
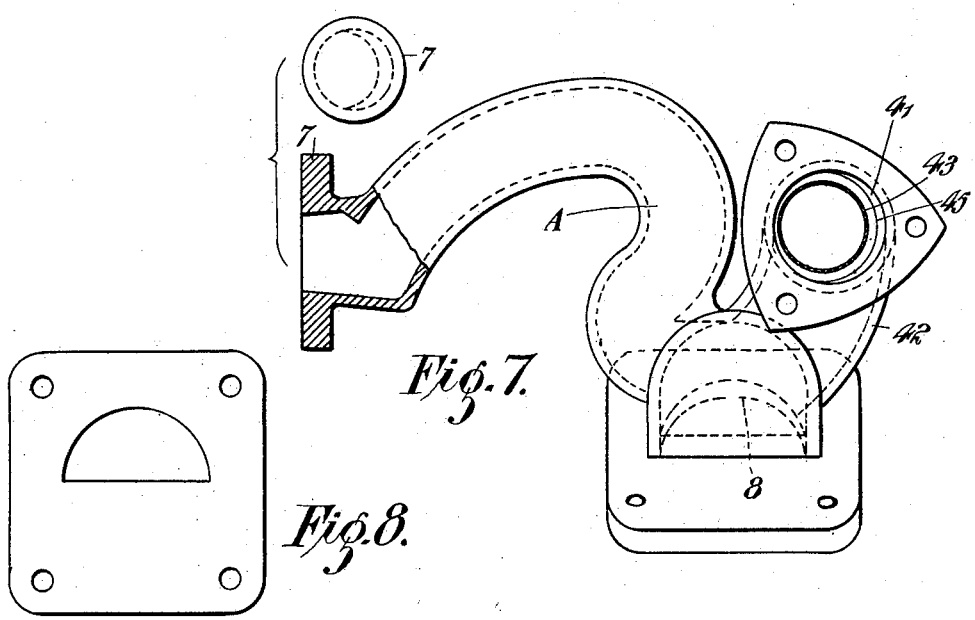

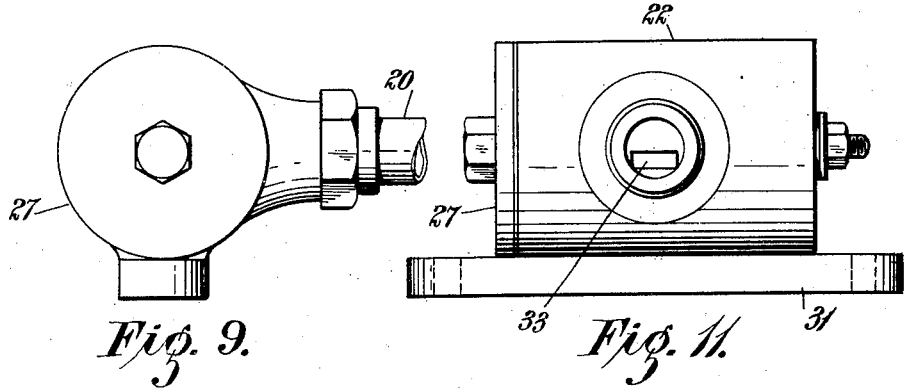
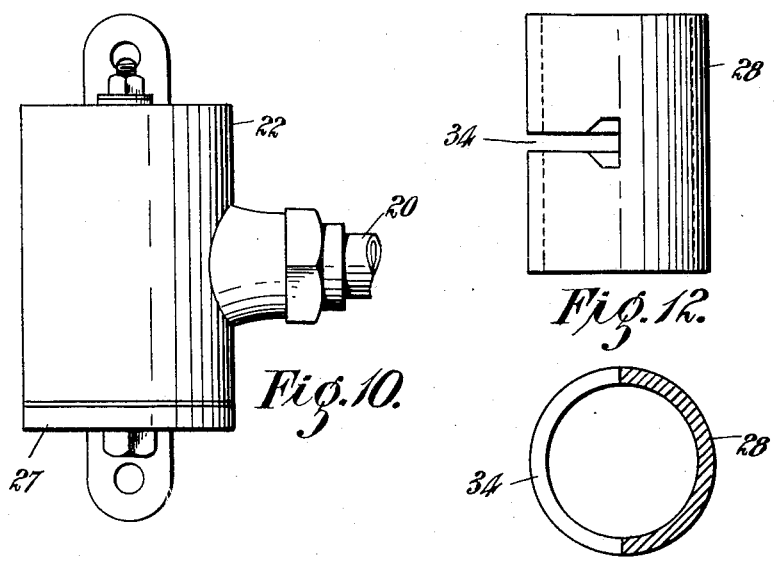
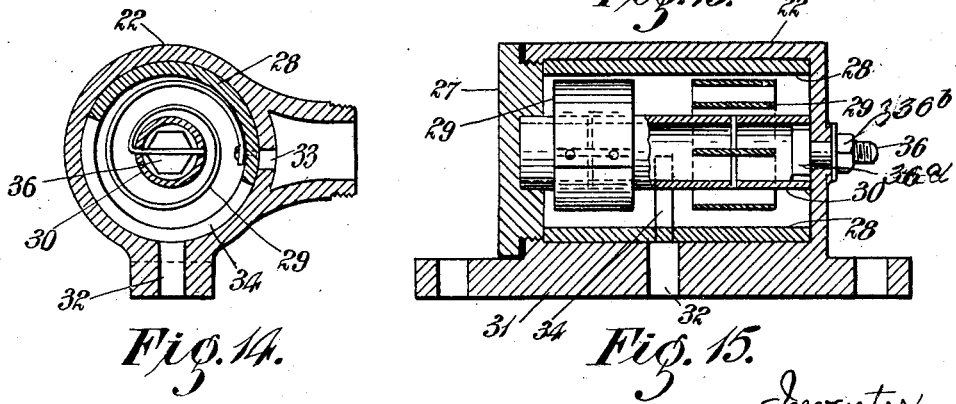

1,744,627

UNITED STATES PATENT OFFICE

GEORGE HAMILTON-GRAPES, OF MELBOURNE, VICTORIA, AUSTRALIA

CARBURATION OF HYDROCARBON LIQUID FUEL FOR INTERNAL-COMBUSTION ENGINES

Application filed March 11, 1926, Serial No. 93,999, and in Australia May 7, 1925.

The universally enormous increase in the use of internal combustion engines and consequent rapid consumption of petroleum for the production of fuel for such engines has directed attention to the fact that within a decade the world's supply of petroleum will be exhausted unless means are provided whereby existing supplies of crude petroleum can be utilized to a fuller extent.

That such a possibility is well realized is evidenced by the gradual decrease in the volatility or increase of the vaporization factor in relation to the heavy end points of distillation, of fuels in use today as motor spirit as compared with average motor spirit in use in the year 1910.

In 1910 the end point was 320
1911 the end point was 350
1914 the end point was 390
1918 the end point was 400
1920 the end point was 427
1923 the end point was 430

In 10 years—1915–1925—the distillation points have risen, for 20% distilled 20° Fah. for 50%, 46° Fah. and for 90%—80° Fah.

At this rate of progression it is reasonable to assume that in 1927 motor spirit will require temperatures of the order of 474°–480° Fahrenheit for efficient vaporization.

With these factors in mind and with a view to economic fuel utilization the applicant by his United States Patent No. 1,471,599 evolved a system of deflecting the heavy moist particles in a carburetted mixture stream into a retort chamber during passage of the mixture to the engine cylinders, the vapor from the chamber returning into the said stream.

Continuous experimental work by the applicant on the system mentioned has achieved material developments therein principally in the provision of means whereby automatically progressive vaporization is effected of the varying degrees of boiling fractions in the moist particles of a carburetted mixture formed by any usual type of carburetter, and also, which is of greater importance, in providing for the effective vaporization of the higher boiling fractions of crude petroleum oil either alone or in conjunction with alcohol, water, shale oil spirit and other oils together with vegetable or mineral matter adapted for such purposes either singly or in various combinations. In other words fuel mixtures involving a petroleum base having an appreciable amount of the higher boiling fraction can be effectively utilized as fuel for internal combustion engines.

By the use of the present invention it will be possible to add 50% more or less of liquid fuels of low cost not at present used in petroleum base motor spirits, to a first grade motor spirit, and obtain increased power output at reduced cost and also largely increase the range of fuel available at present for use in internal combustion engines employed as the power unit in automobiles. As an example, to present day second grade and low grade motor fuels, 15% of the contents of which distill up to 90 degrees centigrade, can be added 30% of the kerosene fractions of crude petroleum oil distilling over above 150 degrees centigrade in conjunction with 12% alcohol of 95% strength and 8% water.

Further to the foregoing the invention provides for the conservation of the lubricating quality and the supplies of engine mineral lubricating oil by the double filtration of all atmospheric air admitted to the engine either through the carburetting system or to the aspirator or breather of the engine-sump or crank case chamber. This admits of the employment more freely of still lighter alloy pistons than is at present possible together with higher compression ratios, through the longer life permitted by the absence of attritive road dust in the lubricating oil. Crankcase dilution is also pronouncedly reduced. Reduction of wear with lessened cost of operation is also secured.

Further and marked advantages of the employment of the invention are that with the addition of an appreciable percentage of alcohol to the fuel gas mixture, the characteristic anti-detonation qualities of this spirit alone would make permissive the employment of still higher engine compression ratios, and when used in conjunction with my retort system providing dry, cool, fully explosive gaseous mixture production, which also in itself possesses marked anti-detonation value, the sum of the increase of higher compression ratios assumes such major proportions as to constitute a marked advance.

Such also still further accentuates the conservation of liquid hydro-carbon petroleum fuel supplies.

With the addition of hydrogen in the form of water by the use of the retort element of my system the rapidity of combustion in the compressed charge is accentuated, due to the decomposition of water, making for increased power output, whilst effecting a saving of the volumetric weight of the fuel used per piston stroke, so making for further conservation.

The gain secured by thus effectively utilizing the greater number of British thermal heat units contained in the kerosene fuel fractions by the use of applicant's invention is appreciable, but when the waste heat from these in the form of exhaust gas is used to supply the high latent heat required for the conversion of alcohol into vapour form the conservation of petroleum base fuel is again further increased.

In practical use the invention achieves other and further material objects of advantage as will hereafter appear.

Broadly, the present invention refers to the carburation of hydro-carbon liquid fuel for internal combustion engines by the method wherein the vapourization of moist fuel particles present in the carburetted mixture furnished by any usual form of carburetting device is effected in a retort so arranged in the line of the mixture stream to the engine that the particles are trapped and vajourized therein by heat derived from the exhaust gases from the engine. The heat applied to said retorts has been thermostatically controlled to provide as far as possible a uniform heat which for effective results must, however, be raised to such a degree that the highest boiling fractions are vapourized with a higher degree of heat than is necessary for lower boiling point fractions with a resultant raising of the temperature in the ultimate mixture delivered to the engine.

By the present invention the necessity for the thermostatic control is eliminated and progressive vapourization effected in the retort, that is to say, the heat in the retort varies throughout its area, whereby the various degrees of boiling fractions in the moist particles are subjected only to a degree of heat necessary for their vapourization.

Further to the progressive vapourization mentioned the invention also consists of the introduction of air, steam or water vapour in conjunction with alcohol or singly or in varied combination with shale oil spirit or other oils together with vegetable or mineral matter adaptable for such purposes by a heated conduit contained in the crown of the retort element, in the presence of the vapours of petroleum base hydro-carbons in the lower portion or toe-well of the retort, during the process of progressive vapourization, thus assisting in the breaking down of the heavy or decane series of fractions of the hydro-carbons in the fuel.

The accompanying drawings depict a practical application of the invention.

In these drawings—

Figures 1 and 2 are a front and an end sectional elevation respectively of the entire assembly of parts embodying the invention. Figure 3 is a longitudinal sectional elevation, and Figure 4 a plan of the mouth of a progressive vaporization retort arranged according to the invention, Figures 5, 6 and 7 being respectively an end elevation, a side elevation and a plan view of that portion of said assembly herein referred to as the separator element. Figure 8 is a plan of the flange of said element which is coupled to the mouth of the retort element.

Figures 9, 10 and 11 are end elevation, plan, and side elevations respectively of a thermostatically controlled air valve for the retort element.

Figures 12 and 13 are plan and central transverse section respectively of the said air valve. Figures 14 and 15 being vertical transverse and longitudinal sections respectively of said valve and its casing.

Figure 16 is a central vertical section of a rotary extra air valve and its casing for delivering air to the main fuel mixture stream beyond the retort element and Figure 17 a side elevation of the valve member disassociated from its casing.

Figure 3:
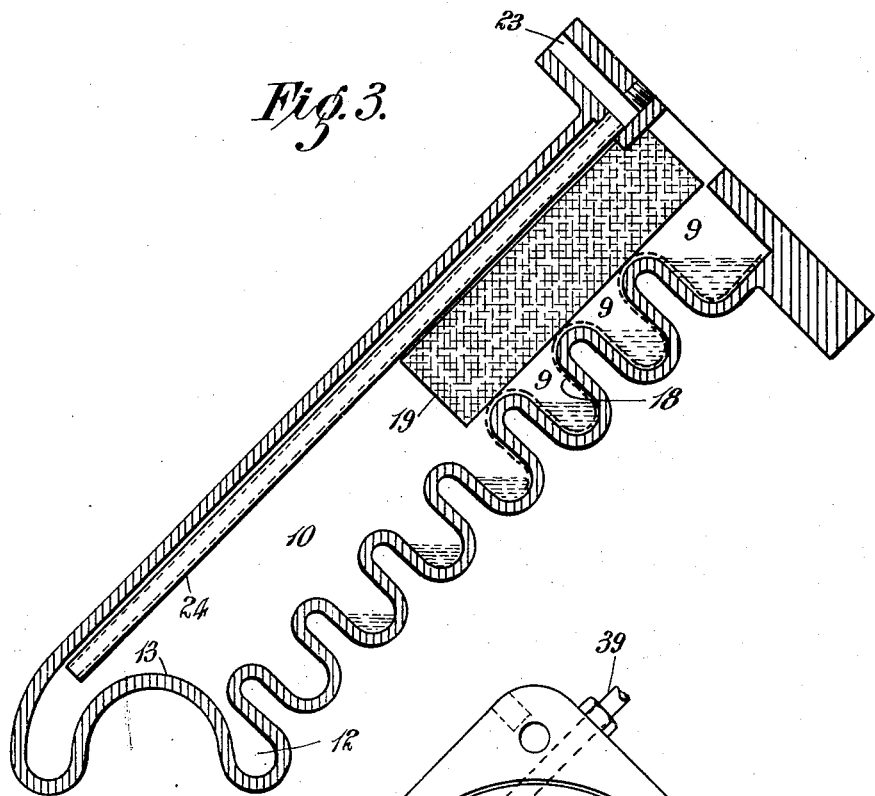
Figure 4:
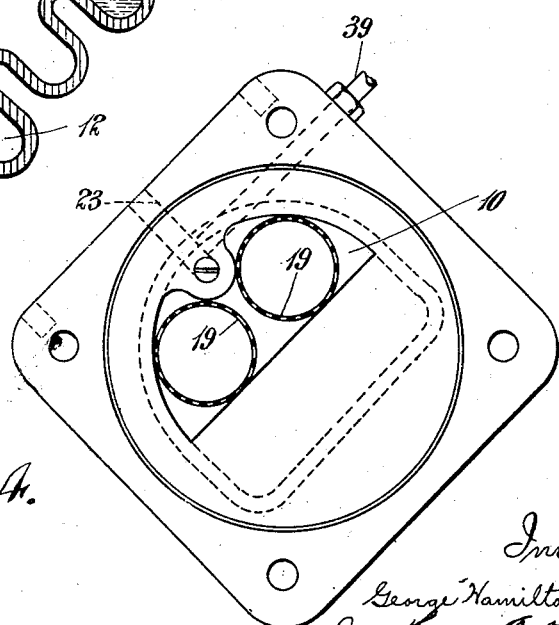

The moist particles of the heavier fuel fractions from the carburetted mixture are deposited upon the walls of the separator element A the flanged entry orifice 7 of which is bolted to any form of standard carburetter employed for fuel metering purposes, said particles being impelled along said walls by the velocity of the mixture stream and thrown out by a combination of the forces of gravity and inertia into the vortex chamber 8 of approximately semi-spherical form and appreciable cross-section, situated in the lower end of the separator element, thence into the upper of the series of progressive vapourization troughs or catchment areas 9 transversely located upon the floor of the retort element 10 which floor is inclined preferably at an angle of 45° more or less to the vertical plane.

As these upper troughs of appreciable size acting as fuel reservoirs are filled during the progress of engine operation, the heavy fuel fractions of a compounded liquid hydro-carbon fuel mixture ultimately, by automatic selective process, arrive and trickle into a trough of reduced cross-sectional area situated towards the lower and hotter section of the retort which for the moment presents the correct degree of heat for the efficient vapourization of same.

To provide for the requisite amount of exhaust gas heat at idling or slow running engine speeds, a circular shallow trough or well 12 is arranged at the extreme lower end of the retort element 10 presenting a considerable area of surface interiorly and exteriorly having a concave dome-shaped centrally situated heat-trap 13 the whole being arranged in a horizontal plane.

The retort element 10 is enclosed in an elongated casing or shroud 14, which may be cast integral with the exhaust manifold 14ª proper of the engine, which casing terminates at its lower or exhaust gas stream delivery end in a globular shaped expansion chamber or bulb 15 of appreciable cross-section which surrounds the toe of the retort. Adjacent to the location of the retort toe, a semi-circular deflector or baffle-plate 16, (see Figure 2) which may be cast integral with the expansion bulb or chamber 15 is arranged in such a manner that the maximum amount of expanding exhaust gases, on their passage to the engine muffler feed pipe (not shown) through discharge 17, impinge upon the under side of the circular shallow well trough 12 and well dome 13 in the retort toe and deliver up the major portion of their heat to same whilst thus expanding.

To more fully conserve and extract the heat given off by the expansion of the exhaust gases discharged by the engine especially at low revolutions per minute this invention provides for lagging by air, charcoal, pumice or other non-heat conducting material, the expansion bulb of the retort shroud or casing by enclosing the same by a shield 15ª of metal cast integral therewith or in other suitable manner having an air-space enveloping two-thirds more or less of the outside area of the bulb and furnishing an air-space not less than one half inch at any one part of its envelopment between the exterior wall of the bulb and the interior wall of its shield, said space having only one connection an aperture 15ᵇ of circular shape and half an inch in diameter with the outside atmosphere which is situated at the lowest point of the bulb proper and forms if need be an aspirating vent.

As the exact position of this point of maximum heat delivery and the diameter of the expansion bulb 15 varies, means are provided for the location of the slow running or idling vapourizing well or the enclosing bulb at such maxima heat spots demanded, by lengthening or shortening the retort and the range of vapourizing troughs in every type of engine fitted with the device.

This ensures the effective vapourization of these heavy fuel fractions at the minimum number of engine revolutions per minute, whilst at all time furnishing early relief to back-pressure in the engine.

To maintain an even and continuous delivery of fuel from the upper or reservoir starting up troughs 9 to the lower or average working temperature progressive vapourizing troughs of the retort thin strips of wire gauze 18 (see Fig. 3) are provided which by their capillary action slowly feed the liquid contents of the upper down into the first of the series of actual progressive vapourizing lower troughs. In order that the upper layer of the lighter of the heavier fuel fractions centrifugally thrown out in the vortex chamber 8 shall not be subjected to prolonged excessive heat, but be instantaneously vapourized one or more tubes of wire gauze 19 are arranged at the mouth of the retort, transversely to the upper series of vapourizing troughs, in such a manner that these fractions are caught thereon and subjected to a continuous stream of hot dry air impinging at speed upon both inner and outer surfaces of the gauze tubes. The air tube 20 for this purpose proceeds from an air filtering chamber 21, hereinafter described, through air control valve chamber 22 hereinafter described, and duct 23 and pipe 24 into the toe of the retort chamber 10. This air supply also functions to cause evacuation in a continuous manner of the vapours of the heavy end points of the fuel as these come off from the heating surfaces of the lower series of progressive vapourizing troughs in the retort element, besides rectifying or maintaining this over-rich fuel vapour with the due amount of extra air requisite to furnish a dry gas mixture.

Two of the functions of this air-duct 24, having an inside diameter of one eighth of an inch more or less leading to the toe-well of the retort, are to, by the admission of air, reduce the depression existing in a retort of this design, having a long extended body and conscribed mouth, or neck so that the danger of "frothing over" of the contents into the mixing and intercooling element of the system, as when an appreciable amount of liquid fuel is present therein, such as starting up the engine from the cold state, and further to prevent "cranking" of the heavy end-points of the fuel at a later operative stage when the engine is furnishing the maximum power output.

This extra-air is not however required during the initial starting up period, especially in winter in cold latitudes when the retort forms a trap to retain the heavy fuel fractions thus preventing in a major degree crank case dilution until the engine has been warmed up by running on the lower boiling or starting up fuel fractions of the gasoline employed. The invention automatically thermostatically furnishes this retort evacuating air supply when the engine has reached its proper operating temperature by means of a control valve in the valve chamber or casing 22 which casing is anchored to the flange 26 of the retort 10 and connects through the internal air-duct 23 in said flange to the pipe 24 leading to the toe of the retort.

The detailed arrangement of this air control valve (see Figs. 9 to 15) is as follows:—

The main parts comprise the casing 22, cap 27, sleeve 28, thermostatic coils 29, and tubular spindle 30.

The functioning of same is as follows:—

It is imperative when starting a cold engine that the maximum velocity of the air be maintained over the fuel jet of the standard carbureter employed, during the suction stroke of the piston, so that the lower boiling fuel fractions may be more completely broken up and atomized.

To this end no air must be admitted to the retort, or mixing chamber elements of the system, until sufficient heat has been generated in the power unit.

When the required degree of engine operating heat has been reached, usually under normal conditions in about two minutes more or less from the time of starting up the engine, the seating 31 has then received sufficient heat, through close contact with the flange 26 of the retort 10 the orifice 32 registering with the mouth of the duct 23—the metal of the casing 22 being preferably composed of an alloy of 90% copper, 9% zinc and 1% tin, to cause expansion and set up increased clearance betwen the close fitting sleeve 28 which is preferably made of stainless steel possessing a low co-efficient of expansion, and said casing 22 and heating and causing appreciable expansion of the two coils 29 of the thermostatic metal firmly attached at either end of same, to the hollow tube 30, one coil being wound clockwise and the other anti-clockwise. This causes the sleeve 28 to slowly rotate in an anti-clockwise direction so uncovering the port 33 leading to the air-supply pipe line 20, and permitting of the necessity aeration of the over-rich fuel vapours collected in the body of the retort from the accumulation of the heavy fuel fractions during the starting up period. The configuration of the slot 34 in the sleeve 28 is such that the maximum amount of air is supplied to the heavy fuel vapours in the retort during the first ten minutes more or less of engine running from the time of starting, but as these vapours are evacuated into the main-mixture air-stream and the normal state of engine operation is reached, the further rotation of the sleeve 28 by the increased expansion of the thermostatic coils 29 continues to furnish the exact and even flow of air required through the retort. The regulation, or setting of the exact supply of air in this manner so necessary to secure the maximum efficiency of operation of the power plant, is obtained through the manipulation of a stop-cock 35 located in the air-supply pipe line 20 near its junction with the main-air filter element 21.

The regulation of the actuation of the thermostatic coils 29 is obtained by the adjustment of the bolt 36 passing longitudinally through the casing 22 and which draws the valve parts together.

The base-plate of the casing 22, is firmly secured to the facing of the retort flange 26 by the studs 37.

The regulation of the actuation of the thermostatic coils 29 is obtained by adjustment of the degree of tightness of the bolt 36 the hexagonal head $36^a$ of which seats within one end of the hollow tube 30 (see Fig. 15) which end is shaped to register with said bolt head. The bolt 36 passes freely through the end wall of the casing 22 as shown and is secured by the nut $36^b$ and the frictional resistance of the bolt against turning movement is proportional to the degree of tightness of the nut $36^b$.

The air-duct 23 is also connected to the supply pipe 39 leading from the alcohol mixture tank 40 so that the mixture stream from the latter is fully pre-heated and aerated on its way to the maximum heat vapourizing toe-well of the retort.

The heavy vapours on issuance from the retort are met and are violently intermingled or incorporated with the main gas mixture stream of carburetted lighter boiling fuel fractions in the vortex chamber 8 and together issue therefrom upwardly on their way to the engine at reduced velocity, into a curved chamber or exit mouth 41 of the separator element A, having a cross-sectional area three times greater more or less than that of the inlet wet-mixture discharge orifice of the separator element leading to the vortex chamber 8, which at the latter point ejects all fluid particles into the mouth of the retort by compelling the mixture stream to make a sharp turn through an arc of 300°, more or less downwardly and upwardly at an angle to the vertical of 45° more or less.

The velocity reduction chamber 42 forms a trap to capture any liquid particles that may remain in the main mixture gas stream at slow running or idling speeds or in starting up the engine from a cold state, and has at its upper end projecting downwardly into and eccentrically arranged in relation to the exit mouth of the chamber a double-lipped extension 43 of the mixing and intercooling element 44. This vapour and main extra-air mixing and inter-cooling chamber 44 is of semi-circular tubular form having a volumetric capacity greater than that of a single cylinder of an engine using the system, and being of less cross-sectional area than the reduction velocity chamber. The annular outer drip lip 45 located around the circumference of the mixing and inter-cooling inlet mouth deflects downwardly any liquid particles that may be deposited upon its outer walls at low engine speeds.

On the flange 46 of the mixing and intercooling chamber 44 registering with that of the reduction velocity chamber 42, is arranged at the point of greatest dry gas turbulence a pipe 47 for the supply of extra-air from the air filtering chamber 21 at atmospheric temperature which is controlled by the engine revolutions automatically to deliver such at any desired rate of speed preferably that of average operation lying between 20 and 40 miles per hour for a motor driven vehicle. That is to say for starting up and maximum power rich gas mixtures are required whilst lean fuel-air ratios are called for by economy operation at average motor vehicle speed ranges.

The detailed arrangement of a control valve (see Figs. 16 and 17) for this extra air to pipe 47 is as follows:

The main parts of the control valve comprise the casing 48, cap 49. Double-beat valve body 50 and cap 51. The valve 50 is enclosed in the casing 48 being free to rotate in opposite directions therein under the influence of the engine suction and governed by the number of the engine piston strokes per minute.

The rotary movement is caused by the passage of air at speed through the spirally cut grooves 52 on the exterior face of the valve 50. This valve is hollow and preferably constructed of aluminium or other suitable light alloy metal and may be loaded with heavy oil or other material to vary the inertia moment of the valve mass in relation to the suction power or depression set up by the number of engine revolutions per minute.

It is well known that a reasonably rich fuel mixture is required for slow-running and maximum power output of an internal combustion engine. In the ordinary operation of passenger motor vehicles, the average speed range is between 20 and 40 miles per hour and herein lies the greatest scope or need for fuel economy, so in practice this valve 50 is set to open and admit the exact amount of extra-air to the main-gas-mixture stream, and which may be regulated and maintained by a stop-cock 53 located adjacent to the main air-filter 21 upon the supply pipe 47 when the speed of the vehicle reaches 20 miles per hour.

The rotative action of the double-beat valve 50 causes the valve faces 54 to at all times automatically grind themselves into a true fit with their seatings 55 contained in the casing 48 and its cap 49, both of which are preferably constructed of the same material or description of aluminium alloy, but with a higher percentage of copper. The casing and its cap are furnished exteriorly with the standard form of carburetter pipe couplings of brass, or other suitable material.

The screw-threaded cap 51 is provided with a screw-driver slot 56 upon its outside upper portion to assist in effectively sealing the material required for loading purposes and contained within the interior of the valve.

The circumferential spiral grooves 52 may be varied in depth and in number to meet the individual operative demands of all types of internal combustion engines.

Gas turbulence is fully maintained by the configuration of the mixing and intercooler chamber 44 up to the moment of delivery of the dry, cool, homogeneous explosive mixture so provided to the engine through the delivery Venturi orifice (not shown) of said chamber which corresponds in cross-sectional area with that of the inlet Venturi mouth 7 of the separator element A of the system registering with the flange of the standard carburetter in use.

All air supplied for carburetting or engine operating purposes is filtered by passage through the main wet air-filter 21, but that used as the main-air supply to the standard carburetter is subsequently again filtered in passing through the heavy fuel fraction separator element of the invention, the walls of which covered by liquid particles of fuel provide efficient means for arresting any foreign matter that may have escaped or entered into the air-stream and passes such into the retort whence escape to the cylinders of the engine in solid form is prevented.

The main air filter 21 is of the centrifugal type and employs waste oil or other liquids as the medium for arresting the particles of road dust and other foreign substances thrown out by centrifugal action on to the walls of the helical core of the filter in the passage of the air-stream through to the engine cylinders.

As previously stated all air required for engine purposes is passed through a main air filter and it is to be understood that the passage of filtered air to the engine breather pipe or aspirator is in itself a novel and distinct feature of the invention. Again any oil sprayed back to the filter from the crank case will be trapped in the filter and act as a further liquid media operating to trap any dust which may pass through the exit chamber of the filter.

The pipe leading filtered air to the crank case will preferably be provided at its lower end with a separator bend or trap from which any excess oil or dust collected therein can be withdrawn.

What I claim and desire to secure by Letters Patent is:—

1. Means for vaporizing hydro-carbon fuel or fuel mixtures consisting of a separator element communicating with the delivery outlet of a carburetter and the cylinders of an internal combustion engine, a retort chamber offset from and in communication with said separator element, means for deflecting the moist particles of the carburetted mixture into said retort, an inclined floor in said retort, a transverse series of troughs on said floor, a casing surrounding said retort, and communicating with a source of heat, a bulbous chamber surrounding the lower end of said retort and a controlled air supply duct delivering to the lower end of said retort.

2. Means for separating and vaporizing the moist particles in a carburetted mixture of a hydrocarbon fuel or fuel mixtures, consisting of a separator element communicating with the delivery orifice of a carburetter and with the cylinders of an internal combustion engine, a retort chamber offset from and in communication with said separator element, said separator element having a double curve between the carburetter and the retort chamber, a vortex chamber in said element overlying the mouth of the retort, said retort being inclined approximately at an angle of 45 degrees to a vertical plane, an inclined series of troughs on the floor of said retort diminishing in capacity towards the bottom of the latter, a casing surrounding said retort and communicating wth a source of heat, a bulbous chamber surrounding the lower end of said retort and a controlled air supply duct delivering to the lower end of the retort.

3. Means for separating and vaporizing the moist particles in a carburetted mixture of a hydrocarbon fuel or fuel mixtures, consisting of a separator element communicating with the delivery orifice of a carburetter and with the cylinders of an internal combustion engine, a retort chamber offset from and in communication with said separator element, said separator element having a double curve between the carburetter and the retort chamber, a vortex chamber in said element overlying the mouth of the retort, a velocity reduction chamber overlying and communicating with the mouth of the retort, a semi-circular shaped tubular mixture cooling conductor leading from said reduction chamber to the engine cylinders, said retort being inclined approximately at an angle of 45 degrees to a vertical plane, an inclined series of troughs on the floor of said retort diminishing in capacity towards the bottom of the latter, a casing surrounding said retort, and communicating with a source of heat, a bulbous chamber surrounding lower end of said retort, and a controlled air supply duct delivering to the lower end of the retort.

4. Means for separating and vaporizing the moist particles in a carburetted mixture of a hydrocarbon fuel or fuel mixtures, consisting of a separator element communicating with the delivery orifices of a carburetter and with the cylinders of an internal combustion engine, a retort chamber offset from and in communication with said separator element, said separator element having a double curve between the carburetter and the retort chamber, a vortex chamber in said element overlying the mouth of the retort, a velocity reduction chamber overlying and communicating with the mouth of the retort, a semi-circular shaped tubular mixture cooling conductor leading from said reduction chamber to the engine cylinders, said reduction chamber having a circular outlet orifice into which the lower end of said tubular conductor is eccentrically inserted, said retort being inclined approximately at an angle of 45 degrees to a vertical plane, an inclined series of troughs on the floor of said retort diminishing in capacity towards the bottom of the latter, a casing surrounding said retort, and communicating with a source of heat, a bulbous chamber surrounding lower end of said retort, and a controlled air supply duct delivering to the lower end of the retort.

5. Means for separating and vaporizing the moist particles in a carburetted mixture of a hydrocarbon fuel or fuel mixtures, consisting of a separator element communicating with the delivery orifice of a carburetter and with the cylinders of an internal combustion engine, a retort chamber offset from and in communication with said separator element, said separator element having a double curve between the carburetter and the retort chamber, a vortex chamber in said element overlying the mouth of the retort, a velocity reduction chamber overlying and communicating with the mouth of the retort, a semi-circular shaped tubular mixture cooling conductor leading from said reduction chamber to the engine cylinders, said reduction chamber having a circular outlet orifice into which the lower end of said tubular conductor is eccentrically inserted, a double lipped deflector termination on the lower end of said mixture cooling conductor, said retort being inclined approximately at an angle of 45 degrees to a vertical plane, an inclined series of troughs on the floor of said retort diminishing in capacity towards the bottom of the latter, a casing surrounding said retort, and communicating with a source of heat, a bulbous chamber surrounding lower end of said retort, and a controlled air supply duct delivering to the lower end of the retort.

6. Means for vaporizing hydrocarbon fuel or fuel mixtures consisting of a separator element communicating with the delivery end of a carburetter and the cylinders of an internal combustion engine, a retort chamber offset from and in communication with said separator element, means for deflecting the moist particles or the carburetter mixture into said retort, an inclined floor in said retort, a transverse series of troughs on said floor, a casing surrounding said retort, and communicating with a source of heat, a bulbous chamber surrounding the lower end of said retort, an air supply duct delivering to the lower end of said retort, and a thermostatically operated valve controlling said duct and communicating with a source of filtered air.

7. Means for vaporizing hydrocarbon fuel or fuel mixture consisting of a separator element communicating with the delivery end of a carburetter and the cylinders of an internal combustion engine, a retort chamber offset from and in communication with said separator element, means for deflecting the moist particles or the carburetter mixture into said retort, an inclined floor in said retort, a transverse series of troughs on said floor, a casing surrounding said retort, and communicating with a source of heat, a bulbous chamber surrounding the lower end of said retort, a controlled air supply duct delivering to the lower end of said retort, and a fuel supply duct communicating with said air duct.

8. Means for separating and vaporizing the moist particles in a carburetted mixture of a hydrocarbon fuel or fuel mixtures, consisting of a separator element communicating with the delivery orifice of a carburetter and with the cylinders of an internal combustion engine, a retort chamber offset from and in communication with said separator element, said separator element having a double curve between the carburetter and the retort chamber, a vortex chamber in said element overlying the mouth of the retort, a velocity reduction chamber overlying and communicating with the mouth of the retort, a semi-circular shaped tubular mixture cooling conductor leading from said reduction chamber to the engine cylinders, said reduction chamber having a circular outlet orifice into which the lower end of said tubular conductor is eccentrically inserted, a rotary extra air control valve actuated by the engine suction communicating with an atmospheric air supply and with said mixture cooling conductor, said retort being inclined approximately at an angle of 45 degrees to a vertical plane, an inclined series of troughs on the floor of said retort diminishing in capacity towards the bottom of the latter, a casing surrounding said retort, and communicating with a source of heat, a bulbous chamber surrounding lower end of said retort, and a controlled air supply duct delivering to the lower end of the retort.

9. Means for vaporizing hydrocarbon fuel or fuel mixtures containing same, consisting of a tubular separator element communicating with the delivery end of a carburetter and the inlet manifold of an internal combustion engine, a retort chamber offset from and in communication with said separator element, means in said separator element between the carburetter and the retort for deflecting the moist particles of the carburetter mixture into said retort, an inclined floor in said retort, a transverse series of troughs on said floor, capillary material on the surfaces of said troughs for feeding the moist particles from the upper to the lower troughs, a casing containing said retort and in communication with a source of heat, a bulbous chamber about the lower end of said casing and a controlled air supply duct delivering to the lower end of said retort.

10. Means for vaporizing hydro-carbon fuel or fuel mixtures containing same, consisting of a tubular separator element communicating with the delivery end of a carburetter and the inlet manifold of an internal combustion engine, a retort chamber offset from and in communication with said separator element, means in said separator element between the carburetter and the retort for deflecting the moist particles of the carburetter mixture into said retort, an inclined floor in said retort, a transverse series of troughs on said floor, capillary material on the surfaces of said troughs for feeding the moist particles from the upper to the lower troughs, a casing containing said retort and in communication with a source of heat, a bulbous chamber about the lower end of said casing, a chamber about said bulbous chamber, and a controlled air supply duct delivering to the lower end of said retort.

11. Means for vaporizing hydro-carbon fuel or fuel mixtures containing same, consisting of a tubular separator element communicating with the delivery end of a carburetter and the inlet manifold of an internal combustion engine, a retort chamber offset from and in communication with said separator element, means in said separator element between the carburetter and the retort for deflecting the moist particles of the carburetter mixture into said retort, an inclined floor in said retort, a transverse series of troughs on said floor, capillary material on the surfaces of said troughs for feeding the moist particles from the upper to the lower troughs, cylindrical gauze material dependent from the mouth of the retort, a casing containing said retort and in communication with a source of heat, a bulbous chamber about the lower end of said casing, a chamber about said bulbous chamber, and a controlled air supply duct delivering to the lower end of said retort.

12. Means for vaporizing hydro-carbon fuel or fuel mixtures consisting of a separator element communicating with the delivery outlet of a carburetter and the inlet manifold of an internal combustion engine, a retort chamber offset from and in communication with said separator element, means for deflecting the moist particles of the carburetter mixture into said retort, an inclined floor in said retort, a transverse series of troughs on said floor, a casing surrounding said retort and communicating with a source of heat, a bulbous chamber surrounding the lower end of said retort, a heat deflector plate in said bulbous chamber a well dome at the lower end of said retort, and a controlled air supply duct delivering to the lower end of said retort.

13. In means for vaporizing hydro-carbon fuel or volatile fuel mixtures for internal combustion engines wherein a retort is employed for vaporizing the moist particles in a carburetter mixture, a thermostatically actuated air valve for controlling air admission to the retort, consisting of a casing attached to the retort and communicating with the atmosphere and with an air duct in the retort, said casing communicating with the retort controlled by a ported sleeve valve actuated by a pair of coils wrapped in opposite directions about a tubular spindle in said casing as and for the purposes specified.

14. The method of preparing a dry, carburetted fuel mixture for internal combustion engines, which comprises gravitationally separating condensed particles of liquid fuel from a stream of a carburetted fuel mixture, collecting said separated particles in a chamber closed at one end and communicating at the other end with said stream, cascading said separated particles in a stream toward the closed end of the chamber through an increasing temperature gradient to vaporize the particles, admitting a controlled supply of air at the closed end during vaporization of the particles, and passing the vaporized product admixed with air into the stream of the carburetted mixture passing to the engine.

15. The method of preparing a dry, carburetted fuel mixture for internal combustion engines which comprises, reducing the speed of a stream of carburetted mixture, gravitationally separating condensed particles of liquid fuel from the stream of a carburetted fuel mixture, collecting the separated particles in a chamber closed at one end and communicating at the other end with said stream, and cascading said separated particles in a stream toward the closed end of the chamber through an increasing temperature gradient to vaporize the particles, admitting a controlled supply of air at the closed end of the chamber and passing the vaporized product admixed with air into the stream of the carburetted mixture.

Dated this eighth day of February, 1926.

GEORGE HAMILTON-GRAPES.